United States Patent Office.

PETER WINTER, OF HORICON, WISCONSIN.

Letters Patent No. 65,032, dated May 21, 1867.

---

IMPROVEMENT IN THE MANUFACTURE OF BROWN METALLIC PAINT.

---

*The Schedule referred to in these Letters Patent and making part of the same.*

---

TO ALL WHOM IT MAY CONCERN:

Be it known that I, PETER WINTER, of Horicon, in the county of Dodge, and State of Wisconsin, have invented certain new and useful improvements in Process of Manufacturing a Brown Metallic Paint; and I do hereby declare that the following is a full, clear, and exact description thereof.

To enable others skilled in the art to construct and use my invention I will proceed to describe it.

My invention consists in a new and useful process for making a fine brown metallic paint from peroxide of iron and manganese, known as dead or shot-iron ore. While the base of all other mineral paints is clay and silica, my metallic brown is composed of the following ingredients: Peroxide of iron, 84.46; sesquoxide of manganese, 4.55; silica, 8.34; alumina, 2.65. I have discovered that the peroxde of iron and manganese exists in some places in a natural state, and is properly termed dead or shot-iron ore. In making my paint, I take this substance and subject it to the action of heat for several hours, or until it softens sufficiently to be ground or pulverized into an impalpable powder; I then place it on iron plates, either in a furnace or oven, and subject it to nearly a red heat for several hours, or until the color has changed and it has become soft and free from grit. By this process, the peroxide of iron is converted or changed to the red oxide. Having thus treated the ore, I grind it, and afterward subject it to further heat, which greatly improves it. It may, however, be used for all common purposes without grinding. It will mix readily with linseed oil, and I use it for all common purposes without grinding. As a paint it flows easily from the brush and leaves upon the surface a glossy, unfading, durable, brown metallic coat, which hardens by exposure, and is unaffected by the weather of any climate or by sea-water. In combination with other paints it gives any shade of brown desired. Coarse linen or canvas covered by it becomes water-proof, is preserved from rot, and does not crack when rolled.

What I claim, is—

The brown metallic paint manufactured from the substance popularly known as dead or shot-iron ore, consisting mainly of peroxide of iron and manganese, when treated substantially as herein described and set forth.

PETER WINTER.

Witnesses:
WM. E. CROFT,
D. W. HALL.